United States Patent [19]

Nagano

[11] Patent Number: 4,557,362

[45] Date of Patent: Dec. 10, 1985

[54] CLUTCH DISC

[75] Inventor: Tamio Nagano, Hirakata, Japan

[73] Assignee: Kabushiki Kaisha Daikin Seisakusho, Osaka, Japan

[21] Appl. No.: 473,271

[22] Filed: Mar. 8, 1983

[30] Foreign Application Priority Data

Aug. 26, 1980 [JP] Japan .......................... 55-121551[U]

[51] Int. Cl.[4] .............................................. F16D 3/14
[52] U.S. Cl. ................................. 192/106.2; 192/70.17; 464/68
[58] Field of Search ................. 192/106.2, 70.17; 464/64, 66, 67, 68

[56] References Cited

U.S. PATENT DOCUMENTS

| | | | |
|---|---|---|---|
| 2,124,013 | 7/1938 | Spase | 192/106.2 |
| 3,762,521 | 10/1973 | Dotter | 464/68 |
| 4,014,423 | 3/1977 | Werner et al. | 192/106.2 |
| 4,139,995 | 2/1979 | Lamarche | 192/106.2 |
| 4,188,806 | 2/1980 | Fall et al. | 192/106.2 |
| 4,401,201 | 8/1983 | Gatewood | 192/106.2 |
| 4,406,357 | 9/1983 | Nagano et al. | 192/106.2 |
| 4,465,172 | 9/1984 | Gatewood | 192/106.2 |

Primary Examiner—Rodney H. Bonck
Assistant Examiner—Richard M. Lorence
Attorney, Agent, or Firm—Armstrong, Nikaido, Marmelstein & Kubovcik

[57] ABSTRACT

A clutch disc forming coil receiving notches integrally interconnected with inner peripheral edges of notched portions, the coil receiving notches being further fitted therein with coil springs, and window holes engaging with the coil springs being provided on side plates. Window holes are arranged on a circumference of a hub flange with spaces provided therebetween, resiliently deformable coil springs are fitted in the window holes in the circumferential direction, notched portions having a prescribed length in the circumferential direction are formed at central portions between window holes on an outer peripheral edge thereof. Stop pins on the plates are adapted to engage with the notched portions with prescribed plays left therebetween in the circumferential direction.

4 Claims, 5 Drawing Figures

FIG. 2
FIG. 3
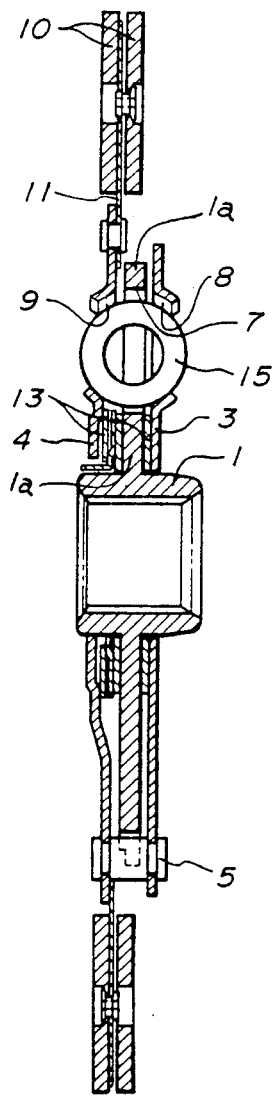
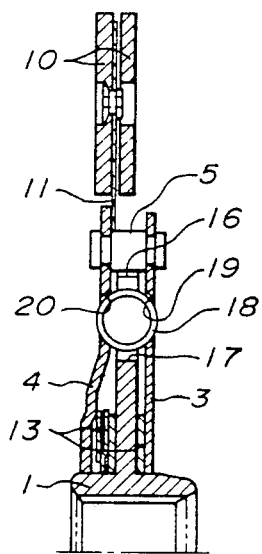

4,557,362

CLUTCH DISC

BACKGROUND OF THE INVENTION

This invention relates to a clutch disc for use in a clutch of an automobile etc.

In conventional clutch as shown in FIG. 5, there has been a clutch disc operating in three successive stages by providing a hub flange 31 with a total of six window holes, each two of first stage window holes 32, second stage window holes 33, and third stage window holes 34. However, since notched portions 36 for stop pins 35 have been arranged completely separately from all the window holes 32, 33, 34, i.e. have not been formed integrally with any one of window holes; portions of a boss flange (hatched portions of FIG. 5) at inner peripheral sides of the notched portions 36 have not been utilized efficiently. Accordingly, peripheral lengths of each window hole 32, 33, 34 have been limited remarkably so that the maximum angle of torsion has not been able to be enlarged more than 8 degrees. In recent years, however, a clutch disc having an angle of torsion of up to approximately 14 degrees has become frequently required depending on types of automobile so that the clutch disc such as illustrated in FIG. 5 has not been able to meet such requirement at all.

An object of this invention is to provide a clutch disc which provides a large maximum angle of torsion and can be easily manufactured.

In order to accomplish the above object, in this invention; in a clutch disc wherein window holes are arranged on a circumference of a hub flange with spaces provided therebetween, resiliently deformable coil springs are fitted in said window holes in the circumferential direction, notched portions having a prescribed length in the circumferential direction, are formed at central portions between window holes on an outer peripheral edge. Stop pins on side plates are adapted to engage with said notched portions with prescribed plays left therebetween in the circumferential direction and a clutch disc is formed with coil receiving notches integrally interconnected with inner peripheral edges of said notched portions, said coil receiving notches are further fitted therein with coil springs, and window holes engaging with the coil springs are provided on said side plates.

BRIEF DESCRIPTION OF THE DRAWINGS

FIG. 2 is a sectional view taken substantially on the line II—II of FIG. 1.

FIG. 3 is a sectional view taken substantially on the line III—III of FIG. 1.

DETAILED DESCRIPTION OF THE INVENTION

Figure 1:
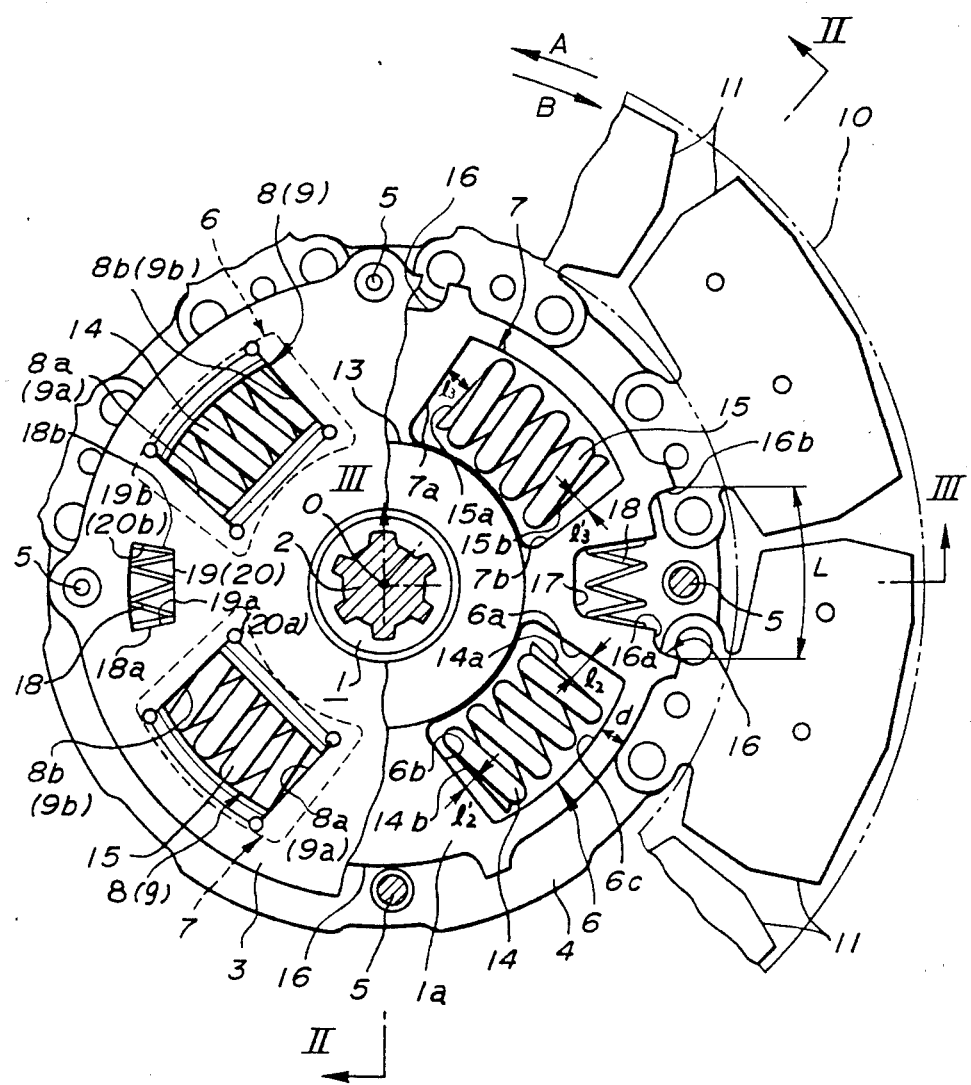
FIG. 1 is a partially fragmental front view of a clutch disc in accordance with this invention.

Referring now to the drawings, a clutch disc in accordance with this invention will be described hereunder. FIG. 1 is a partially fragmentary front view of a clutch disc, wherein 1 is a flange hub spline fitted onto a clutch shaft 2, and 3 and 4 are side plates disposed on both sides of the hub flange 1 and are connected by means of a plurality of stop pins 5 arranged on the same circumference, provided that the side plate 3 is illustrated by cutting away the right half thereof. On the same circumference of the hub flange 1, there is provided a plurality (four shown in the figure) of window holes 6, 7. Window holes 8, 9 (FIG. 2) are also provided on the side plates 3, 4 correspondingly to said window holes 6, 7, resiliently deformable coil springs 14, 15 being fitted in every set of each window hole 6, 8, 9 (7, 8, 9) in the circumferential direction. 10 (only a part thereof being shown by an imaginary line) is a facing plate attached to an outer peripheral edge of one side plate 4 through a cushioning plate 11 (only a part thereof being illustrated), and 13 (FIG. 2) are friction members arranged in between both side faces of a flange portion 1a of the hub flange 1 and both the side plates 3 & 4 respectively. In FIG. 1, coil springs 14 fitted in a pair of opposing window holes 6 at upper-left & lower-right portions and window holes 8 & 9 corresponding thereto are for use in the second stage torsion rising, and coil springs 15 fitted in a pair of opposing window holes 7 at upper-right & lower-left portions and window holes 8 & 9 corresponding thereto are for use in the third stage torsion rising. Namely, a space $l_2$ between a side edge 14a of the second stage coil spring 14 and a side edge 6a of the window hole 6 is made smaller than a space $l_3$ between a side edge 15a of the third stage coil spring 15 and a side edge 7a of the window hole 7. Further, a space $l_2'$ between the other side edge 14b of the second stage coil spring 14 and the other side edge 6b of the window hole 6 is also made smaller than a space $l_3'$ between the other side edge 15b of the third stage coil spring 15 and the other side edge 7b of the window hole 7. Said four coil springs 14, 15 come into contact with the window holes 8, 9 of the side plates 3, 4 at their both side edges 14a, 14b, 15a, 15b on both side edges 8a, 8b, 9a, 9b of the window holes 8, 9.

On an outer peripheral edge at a central portion between window holes 6, 7 of the flange portion 1a, there is formed a notched portion 16, shown in FIG. 1 to the right and left of shaft 2, having a prescribed length L in the circumferential direction, and said stop pin 5 engages with the notched portion 16 with prescribed plays left therebetween.

A coil receiving notch 17 is formed on and integrally interconnected with an inner peripheral edge 16a of the notched portion 16 for said stop pin 5. This coil receiving notch 17 interconnects with the notched portion 16 for the stop pin 5 and is fitted therein with a first stage coil spring 18 having a weak elastic force and a small coil diameter, so that it is not necessary to cut the coil receiving notch 17 deeply in the direction of the center O of the clutch disc, thus the circumferential length L can be taken sufficiently long without weakening the strength of the flange portion 1a. Window holes 19, 20 engaging with the coil springs 18 are formed also on the side plates 3,4 (FIG. 3). Since the coil spring 18 is for use in the first stage in case of the embodiment of FIG. 1, both side edges 19a, 19b, 20a, 20b of the window holes 19, 20 of said side plates 3, 4 come in contact with both side edges 18a, 18b of the coil spring 18. Further, the inner peripheral edge 16a of the notched portion 16 for the stop pin 5 is positioned at about the midpoint of the radial width d of the hub flange portion which extends between the outer peripheral edge 6c of the window hole 6 and the outer peripheral edge of the hub flange 1. This enables the outer peripheral portion of the hub flange 1 to be utilized as a space for the coil receiving notch 17. The coil receiving notch 17 uses this space more effectively than other window holes 6, 7 by achieving additional useful space approximately half of the width d, without weakening the strength of the hub flange 1.

FIG. 2 is a sectional view taken substantially on the line II—II of FIG. 1, and FIG. 3 is a sectional view taken substantially on the line III—III of FIG. 1, which together clearly show the positional relation between the side plates 3, 4 and the hub flange 1 and circumstances of the window holes 19, 20 etc. of the side plates 3, 4.

Functions of the clutch disc will be described briefly hereunder, as they are not so different from those of conventional disc. When torsional torque of the side plates 3, 4 rotating in the direction of the arrow A of FIG. 1 increases, the side plates 3, 4 begin to be distorted relatively to the hub flange 1, which is rotating in the direction of the arrow A, against the first stage coil spring 18 in the direction of the arrow A. After the hub flange 1 has been distorted by an amount corresponding to the space $l_2$, the side edge 14a of the second coil spring 14 comes in contact with the edge 6a of the window hole 6 of the hub flange and the second stage coil spring 14 also begins to act. Moreover, when the distortion has reached an amount corresponding to the space $l_3$, the side edge 15a of the third stage coil spring 15 comes in contact with the edge 7a of the window hole 7 and the third stage coil spring 15 also begins to act. Further increase in the rotating torque thereof will cause a contact of the stop pin 5 with the side edge 16b of the notched portion 16, thus bringing about the direct coupling condition of the side plates 3, 4 with the hub flange 1 through the stop pin 5.

Figure 4:
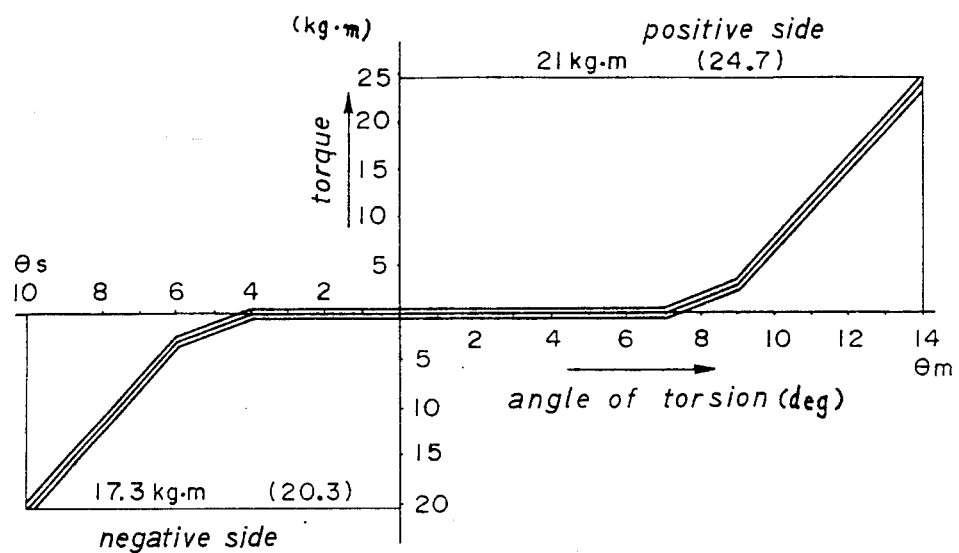
FIG. 4 is a characteristic curve of torsion of a clutch disc in accordance with this invention.
Figure 5:
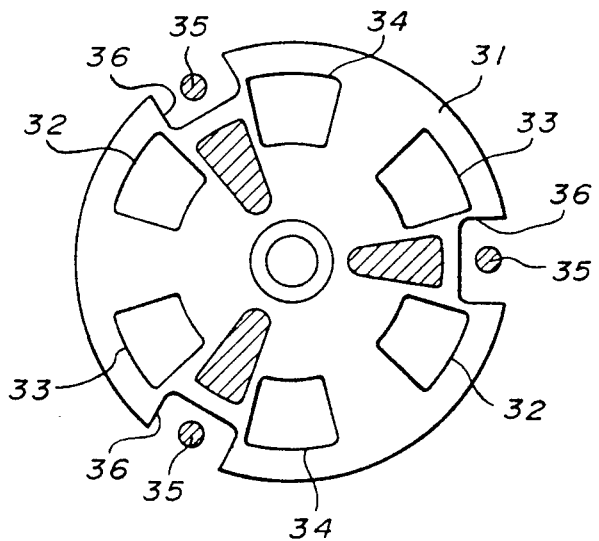
FIG. 5 is a front view of a hub flange of a conventional clutch disc.

FIG. 4 is a characteristic curve of torsion for the clutch disc of said embodiment; wherein the axis of ordinate represents a torsional torque (kg-m) and the axis of abscissa represents an angle of torsion (deg.); the right side thereof is a positive side characteristic curve of torsion, i.e. a characteristic curve of relative torsion of the side plates 3, 4 (FIG. 1) in the direction of the arrow A with respect to the hub flange 1, and the left side thereof is a negative side characteristic curve of torsion, i.e. a characteristic curve of relative torsion of the side plates 3, 4 in the direction of the arrow B with respect to the hub flange 1. Namely, the positive side maximum angle of torsion $\theta m$ can be enlarged up to 14 degrees and the negative side maximum angle of torsion $\theta s$ can be enlarged up to 10 degrees according to the clutch disc shown in FIG. 1.

As described above, the following advantages are obtainable in accordance with the present invention:

(1) The maximum angle of torsion can be secured up to a range of 14 to 20 degrees. Since the coil receiving notch 17 is formed on and integrally interconnected with the inner peripheral edge 16a of the notched portion 16 for the stop pin 5, a part of the boss flange 1 at the inner peripheral side of the notched portion 16 can be utilized efficiently, circumferential lengths of the window holes can be enlarged wider than those of conventional ones, thus a large maximum angle of torsion being obtainable.

(2) This type of clutch disc can be manufactured easily and at less cost. Namely, it is not necessary to enlarge a diameter of the boss flange 1 to widen the spaces for the window holes 6, 7 for the purpose of securing large angles of torsion, so that the disc can be manufactured with approximately the same coil diameter as conventional one. Further, since the notched portion 16 for the stop pin 5 is formed integrally interconnected with the coil receiving notch 17, manufacturing thereof becomes simple.

(3) The space of the hub flange 1 can be utilized much more efficiently by fitting the first stage coil spring 18 into the coil receiving notch 17. That is, since a small-diameter spring having a weak elastic force is ordinarily used for the first stage coil spring 18, the notch 17 can be formed in a comparatively shallow shape to permit the circumferential width of the notch 17 to be secured more widely without weakening the strength thereof.

Although the coil receiving notches 17 are formed in two places in FIG. 1, the coil receiving notches 17 may be formed also in the notches portions 16 for the upper and lower stop pins 5 in addition to the aboves. The coil springs fitted in the coil receiving notches 17 are not limitted to the first stage coil springs 18, but the second stage and the third stage coil springs may also be fitted in the notches. In case of the second stage and the third stage coil springs fitted therein, however, prescribed spaces must be provided between both side edges of the coil receiving notch 17 and both sides of the coil spring respectively.

What is claimed is:

1. In a clutch disc comprising a hub flange having a plurality of window holes arranged on a circumference thereof, an inner resiliently deformable coil spring fitted into each of said window holes with its axis extending in the circumferential direction, said flange being formed at an outer peripheral edge with a plurality of stop pin notched portions of a prescribed length in the circumferential direction centrally positioned between window holes, side plates positioned at each side of said hub flange and having window holes formed therein to engage said inner coil springs, and said side plates being connected by stop pins adapted to engage with said stop pin notched portions to provide a prescribed play in the circumferential direction, the improvement comprising:

coil receiving notches formed in said stop pin notched portions of said hub flange integrally connected with and extending inwardly from peripheral edges of said notched portions so that the outer peripheral edges of said coil receiving notches are radially farther out than the outer periphery of said window holes of said inner coil springs;

outer coil springs disposed in said coil receiving notches and extending circumferentially with their outer portions at said outer peripheral edges of said notches; and window holes formed in said side plates and adapted to engage said outer coil springs.

2. The improvement in a clutch disc as claimed in claim 1 wherein said outer coil springs have weak elastic force and a small coil diameter, and the inner peripheral edges of said coil receiving notches for said outer coil springs are radially farther out than the inner peripheral edges of said window holes for said inner coil springs.

3. The improvement in a clutch disc as claimed in claim 1 wherein said coil receiving notches are formed centrally in said stop pin notched portions of said flange.

4. The improvement in a clutch disc as claimed in claim 2 wherein said coil receiving notches are formed centrally in said stop pin notched portions of said flange.

* * * * *